July 28, 1936. C. O. MARSHALL 2,049,269
VOLUMETRIC TESTING DEVICE
Filed March 25, 1932 2 Sheets-Sheet 1
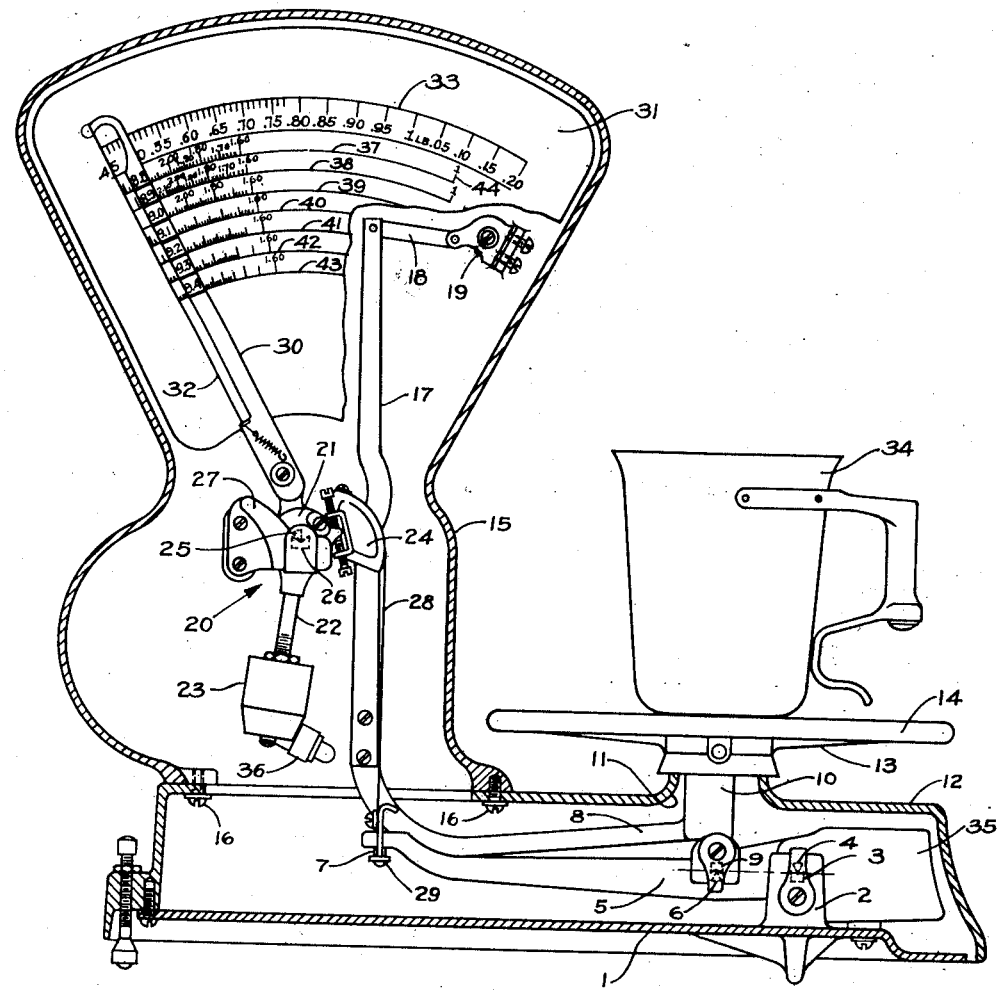
Fig. I
INVENTOR.
Charles O. Marshall July 28, 1936.　　　　C. O. MARSHALL　　　　2,049,269
VOLUMETRIC TESTING DEVICE
Filed March 25, 1932　　　　2 Sheets-Sheet 2
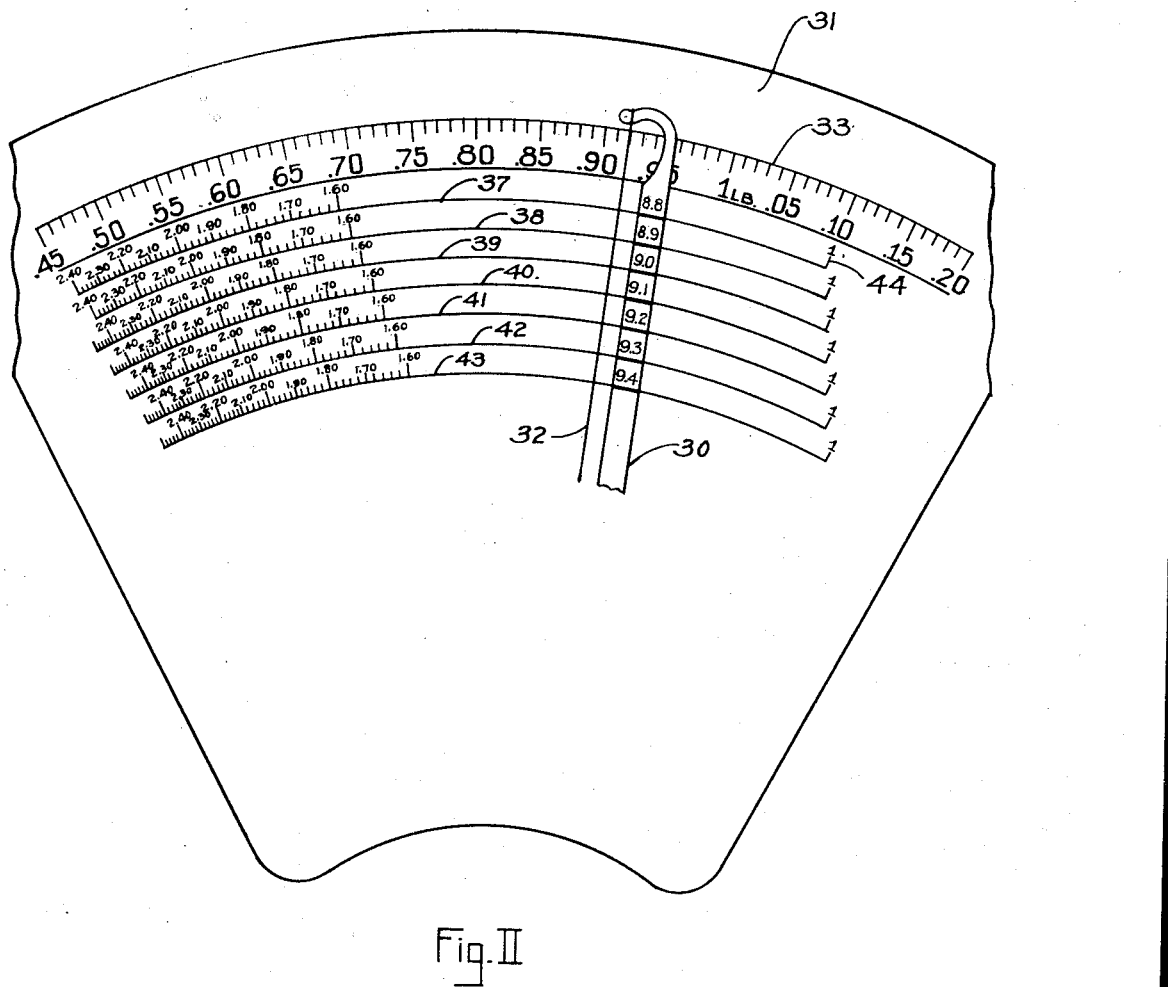
Fig. II
INVENTOR
Charles O. Marshall Patented July 28, 1936

2,049,269

UNITED STATES PATENT OFFICE 2,049,269

VOLUMETRIC TESTING DEVICE

Charles O. Marshall, Toledo, Ohio, assignor to Toledo Scale Manufacturing Company, Toledo, Ohio, a corporation of New Jersey Application March 25, 1932, Serial No. 601,216

2 Claims. (Cl. 265—36)

This invention relates to means for determining gains in volume of treated masses of material and in particular to tests employed in the manufacture of ice cream.

The principal object of the invention is the provision of improved means for determining and instantaneously and directly indicating the proportion, in volume, of ice cream to mix.

Another object is the provision of simple and efficient means for determining and indicating in terms of volume per unit of weight, weights of sample commodities having substantially the same volume.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view, the housing broken away, of a device which embodies the apparatus of my invention.

Figure II is an enlarged front elevational view of an indicating chart characteristic of my invention and of a portion of the indicator associated therewith.

Referring to the drawings in detail, the device comprises a load-receiving mechanism, load-counterbalancing mechanism and associated means for indicating weight and simultaneously the proportion, in volume, of ice cream to "mix", mix being the term given by ice cream manufacturers to the liquid composition from which ice cream is made.

The load-receiving mechanism includes a base plate 1 having upwardly extending horns 2 provided with suitable bearings 3 upon which fulcrum pivots 4 of a load-supporting lever 5 are rockingly mounted. This lever is also equipped with load pivots 6 and a nose pivot 7 which are in spaced relation to the fulcrum pivots. A load-supporting spider 8 rests, by means of bearings 9, on the load pivots of the lever, and a portion 10 of the spider extends through an aperture 11 of a base casing 12 to which the base plate 1 is fastened. A spider arm 13, adapted to hold a load platter 14, is secured to the portion 10 of the spider 8 which extends above the base casing 12. Another portion of the spider curves upwardly into the interior of a hollow housing 15 erected on the opposite end of the base casing and fastened thereto by screws 16. To maintain the condition of level of the load spider and load platter, a check riser 17 is firmly fastened to that portion of the spider which extends into the housing 15 and is pivotally connected to a check link 18 at its upper end, the other end of the check link pivotally engaging a lug 19 which is adjustably fixed to the right wall of the housing. This check link forms, in the well known manner, a parallelogram with that portion of the lever 5 bounded by the knife edges of the fulcrum and load pivots.

The load-counterbalancing mechanism consists primarily of a pendulum 20 comprising a pendulum body 21, a stem 22 screwed therein, a weight 23 adjustably threaded thereon and an eccentric power sector 24 which is adjustably secured to the body 21. A knife edged pivot 25, extending transversely through the body and resting in suitable bearings 26 fixed in a bracket 27 which is fastened to the rear wall of the housing 15, forms the axis on which the pendulum rocks. To connect this load counterbalancing pendulum to the load-supporting mechanism a flexible metallic tape 28 is provided which overlies and is fastened to the upper end of the arcuate surface of the eccentric sector and has a stirrup 29 fastened to its lower end which engages the nose pivot 7 of the lever 5.

The indicating means comprises a relatively movable indicator 30 and chart 31. This indicator is fastened to the pendulum body 21 and when the pendulum is rocked by a load placed on the load-receiving platter 14 it sweeps across the face of the chart, which is fastened to the rear wall of the housing immediately back of the indicator, an angular distance commensurate with the weight of such load and an index line 32 fastened between projecting portions of the indicator instantaneously selects the proper indicium of a series 33 of weight indicia. Since the operation of pendulum scales of this type is generally understood, a more detailed description is not necessary.

The container for the sample to be tested is a cup 34 having a volumetric capacity of approximately 1 pint. The weight of sufficient mix to fill the cup may be in some cases nearly 1.2 pounds. The capacity of the chart 31, however, is only .75 pound, the first .45 pound of the net capacity of the scale being backweighted by placing additional weight in a lever loading box 35 located to the right of the fulcrum pivots 4. The scale is also backweighted for the weight of the cup itself, which constitutes tare. In order to prevent the indicator from striking the wall of the housing or other injury to the mechanism when the load is quickly removed from the platter, I have provided a stop 36 which is engaged by the pendulum as the indicator approaches the left wall of the housing.

By making the capacity of the automatic load-counterbalancing mechanism only .75 pound, the graduations on the chart may be more widely spaced than would be the case if the total net capacity of the scale were counterbalanced by the automatic counterbalancing mechanism and indicated on the chart. The weight graduation representing .60 pound or one-half of the total net capacity of the scale is, for example, located only one-fifth the distance from the left side to the right side of the chart instead of half the distance as would be the case if the total net capacity of the scale were indicated on the chart.

In addition to the series 33 of weight indicia, the chart is provided with additional concentric series 37 to 40 of graduations evaluated to indicate the proportion of volume of ice cream to the volume of mix from which the ice cream was frozen. The graduation 44 at the right end of the series 37 is located in the position to which the index line of the indicator hand will be brought when the cup 34 filled with mix weighing 8.8 pounds per gallon is place on the platform 14. As shown in the drawings, this graduation 44 is substantially in radial alignment with the graduation corresponding to 1.10 pounds in the series 33 of weight graduations. The graduations at the right ends of the series 38, 39, 40, 41, 42 and 43 are progressively angularly offset to the right to the positions to which the index line will be brought when the cup 34 is placed on the platform 14 and filled with samples of mix weighing 8.9 pounds, 9.0 pounds, 9.1 pounds, 9.2 pounds, 9.3 pounds and 9.4 pounds, respectively. The weights per gallon of mix, cups 34 full of which will cause the indicator hand to carry the index line to positions adjacent the several indicia at the right ends of the series 37 to 43 of graduations, are printed on the indicator hand over the series of graduations to which they pertain.

When the mix is frozen into ice cream its volume is increased and its weight per unit of volume is decreased in inverse proportion. If, for example, the volume is doubled, the weight per unit of volume will be halved. The volume of ice cream obtained from a given lot of mix is equal to the original volume of the mix multiplied by the reciprocal of the weight per unit of volume. If the weight of a given volume of ice cream is one-half the weight of the same volume of mix, the total volume of ice cream obtained from a given lot of mix will be twice the volume of mix. If the weight of the unit of volume of ice cream is $$\frac{1}{2.10}$$

the volume of the ice cream will be 2.10 times the volume of the mix from which it was obtained.

In order to provide a chart which is readable directly in proportion of volume of ice cream to volume of mix, I locate graduations on each of the series 37 to 43 at the several positions to which the index line 32 will be brought by fractions ranging from $$\frac{1}{2.40} \text{ to } \frac{1}{1.60}$$

of the weight required to move the index line into registration with the indicium at the right end of the series and assign to the graduations so located values which are the reciprocals of the fractions according to which they are located. For example, at the location to which the index line will be brought by a net load equal to $$\frac{1}{2.3}$$

of the load required to bring the index line to the indicium at the right end of the series I place a graduation and number the graduation with the reciprocal of the fraction, or 2.30; at the location to which the index line is brought by a load one-half the weight required to bring the index line to the graduation at the right end of the series I place a graduation and designate it 2.00, etc.

When ice cream is to be tested by my improved apparatus, the cup 34 is first filled with the unfrozen mix and placed on the platter 14, thus causing the indicator to move until the index line is in juxtaposition to one of the indicia 44 at the right end of the series 37 to 43. If, for example, the index line moves to a position adjacent the right indicium of the series 38, the operator knows that the weight per gallon of mix is 8.9 pounds because the designation 8.9 is on the portion of the indicator hand which swings over the series to which that graduation belongs. After the freezing of the cream has proceeded far enough so that in the operator's opinion it is nearing completion, he takes a second sample which fills the cup, and, therefore, has the same volume as the sample of mix, and places it in the cup on the platform. The frozen mass being lighter than was the equal volume of mix, the indicator will come to rest with the index line adjacent one of the graduations at the left side of the proper series and the operator may read from the chart directly the proportion of volume of ice cream to the volume of the original mix. If the volume has doubled, the reading will be 2.00. If the volume has been multiplied by 2.10, the reading will be 2.10. By taking and testing samples he thus may keep track of the change of volume of the ice cream and stop the operation whenever the required volume has been reached.

I have illustrated apparatus adapted to test ice cream made from mixes weighing from 8.8 pounds per gallon to 9.4 pounds per gallon by increments of $\frac{1}{10}$ pound. This range may be extended or diminished and the increment varied as desired. I have illustrated the apparatus also as adapted for indicating volumes ranging from 1.60 to 2.50 times the volume of the mix by increments of 1/100 of the volume of the mix. These ranges may be extended or diminished and the increments varied as desired.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including a container of definite volume, automatic load-counterbalancing mechanism, a chart and index, said chart and index having relative movement controlled by said automatic weighing mechanism, said chart bearing a plurality of series of graduations, the graduations of each said series being evaluated by taking the reciprocals of the fractions of the weight of ice cream mix required to fill said container constituted respectively by the weights of ice cream frozen therefrom required to fill said container.

2. In a device of the class described, in combination, weighing mechanism including a container of definite volume, automatic load-counterbalancing mechanism, a chart and index, said chart and index having relative movement controlled by said automatic weighing mechanism, said chart bearing a plurality of series of graduations, the graduations of each said series being evaluated by taking the reciprocals of the fractions of the weight of ice cream mix required to fill said container constituted respectively by the weights of ice cream frozen therefrom required to fill said container, the corresponding graduations of the several series being offset.

CHARLES O. MARSHALL.